United States Patent
Park et al.

(10) Patent No.: US 7,467,251 B2
(45) Date of Patent: Dec. 16, 2008

(54) FLASH MEMORY DATA STORAGE APPARATUS

(75) Inventors: Min-Gun Park, Suwon-si (KR); Jin-Wook Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 159 days.

(21) Appl. No.: 11/224,662

(22) Filed: Sep. 12, 2005

(65) Prior Publication Data

US 2006/0136649 A1    Jun. 22, 2006

(30) Foreign Application Priority Data

Dec. 17, 2004   (KR) .................... 10-2004-0107676

(51) Int. Cl.
G06F 13/40 (2006.01)
G06F 13/38 (2006.01)
G06F 13/14 (2006.01)

(52) U.S. Cl. .................. 710/307; 710/74; 710/305
(58) Field of Classification Search .............. 710/52, 710/305, 307, 66, 74; 711/103, 167, 5; 365/232, 365/233, 185.08, 189.04, 229; 375/354; 713/324
See application file for complete search history.

(56) References Cited

U.S. PATENT DOCUMENTS

| | | | | |
|---|---|---|---|---|
| 5,438,549 A | * | 8/1995 | Levy | 365/229 |
| 5,487,092 A | * | 1/1996 | Finney et al. | 375/354 |
| 5,926,838 A | * | 7/1999 | Jeddeloh | 711/167 |
| 6,016,549 A | * | 1/2000 | Matsushiba et al. | 713/324 |
| 6,256,685 B1 | * | 7/2001 | Lott | 710/52 |
| 6,295,246 B2 | * | 9/2001 | Jeddeloh | 365/233 |
| 6,401,161 B1 | * | 6/2002 | Nolan et al. | 711/5 |
| 6,882,568 B2 | * | 4/2005 | Shiota et al. | 365/185.08 |
| 7,082,489 B2 | * | 7/2006 | Yeh et al. | 710/305 |
| 7,152,131 B2 | * | 12/2006 | Saen et al. | 710/307 |
| 7,206,233 B2 | * | 4/2007 | Shiota et al. | 365/189.04 |
| 2002/0013880 A1 | | 1/2002 | Gappisch et al. | 711/103 |
| 2002/0083262 A1 | * | 6/2002 | Fukuzumi | 711/103 |
| 2003/0041223 A1 | * | 2/2003 | Yeh et al. | 711/167 |
| 2005/0073899 A1 | * | 4/2005 | Gallivan et al. | 365/232 |
| 2005/0097263 A1 | * | 5/2005 | Wurzburg | 711/103 |

FOREIGN PATENT DOCUMENTS

KR   1020000026300   5/2000
KR   1020000060710   10/2000

* cited by examiner

Primary Examiner—Mark Rinehart
Assistant Examiner—Thomas J. Cleary
(74) Attorney, Agent, or Firm—Mills & Onello, LLP

(57) ABSTRACT

A flash memory data storage apparatus comprises a flash memory and a flash interface. The flash memory transceives data through a flash bus group. The flash interface includes first through n'th flash input buffers that transfer data to a host bus group in stages in response to first through n'th transfer clock control signals. An i'th flash input buffer provides data through i'th input-buffer bus groups in number of at least Ni. A bus width of each of the i'th input-buffer bus groups is wider than a bus width of each of an (i–1)'th input-buffer bus groups. A period of an i'th transfer clock control signal is longer than a period of an (i–1)'th transfer clock control signal. The Ni is obtained by dividing a bus width of the flash bus group by dividing the bus width of the flash bus group by the bus width of the each of the i'th input-buffer bus groups.

14 Claims, 13 Drawing Sheets

FLASH MEMORY DATA STORAGE APPARATUS

CROSS-REFERENCE TO RELATED APPLICATIONS

This U.S. non-provisional patent application claims priority under 35 U.S.C. § 119 to Korean Patent Application 2004-0107676 filed on Dec. 17, 2004, the entire contents of which are hereby incorporated by reference.

BACKGROUND

The present invention relates to a data storage apparatus and, more particularly, to a flash memory data storage apparatus including a NAND-type flash memory.

There continues to be an increasing demand for nonvolatile memory devices capable of being electronically programmed and erased, and which can retain data despite removal of a power supply. In particular, NAND-type flash memories are widely used as storage devices for music, photographs, and so forth, because they are able to store a large number of data in a given chip size.

Meanwhile, as many computer users continue to require a ever-faster system operation, the standard for system operating speed (or frequency) of a computer has become graded up to about a 10 ns operation cycle. However, standard NAND-type flash memories have data access cycles on the order of 80 ns due to the cycle time consumed by the control for data lines during program and read operations. For this reason, it has been difficult to for data storage apparatus containing such NAND-type flash memory devices to have operation cycles that correspond with those of external systems.

In order to address this limitation, techniques have been proposed in which buffer memory is embedded in a flash memory data storage apparatus. In such a case, the buffer memory stores data belonging to one page of a flash memory. While data of a page of the buffer memory is provided for use by the external system, data of another page is transferred to the buffer memory from the flash memory. This approach leads to improved data transmission speed (i.e., data rate) between the external system and the flash memory data storage apparatus to a certain degree.

However, since the data rate between the flash memory and the buffer memory is still relatively low, the resulting system is generally insufficient for meeting user demand for data transmission speed (i.e., data rate) between an external system and the flash memory data storage apparatus in modern systems.

SUMMARY OF THE INVENTION

The present invention provides a flash memory data storage apparatus that improves the rate of data exchange between an external system and a flash memory.

In one aspect, the present invention is directed to a flash memory data storage apparatus that transceives data with an external system through a host bus group in parallel. The apparatus comprises: a flash memory that transceives data through a flash bus group, a bus width (FW) of the flash bus group being greater than a bus width (HW) of the host bus group, where the bus width represents the number of bus lines that transceive data in parallel in response to a same clock signal; and a flash interface that controls a data transmission operation between the flash bus group and the host bus group. The flash interface includes first through n'th flash input buffers that transfer data to the host bus group in stages in response to first through n'th transfer control clock signals, where $n \geq 2$. An i'th flash input buffer, where $2 \leq i \leq n$, provides data through i'th input-buffer bus groups in number of at least Ni, wherein a bus width (IBWi) of each of the i'th input-buffer bus groups is wider than a bus width (IBWi−1) of each of an (i−1)'th input-buffer bus groups, wherein a period (Ti) of an i'th transfer control clock signal is longer than a period (Ti−1) of an (i−1)'th transfer control clock signal, and wherein Ni is obtained by dividing the FW by the IBW.

In one embodiment, the bus width (IBWi) is twice the bus width (IBWi−1). In another embodiment, the period (Ti) is twice the period (Ti−1). In another embodiment, the flash interface further comprises a control clock generator that supplies the first through n'th transfer control clock signals.

In another embodiment, the control clock generator comprises: a reference clock generator that supplies a j'th transfer control clock signal; and a period modulator that varies a period of the j'th transfer control clock signal and that provides the first through n'th transfer control clock signals, wherein j is (n+1)/2 when n is an odd number, and wherein j is n/2 when n is an even number.

In another embodiment, the i'th flash input buffer comprises i'th data latches, in number of the Ni, providing data each for the i'th input-buffer bus groups in response to sequential clock pulses in the i'th transfer control clock signal every Ni pulses.

In another embodiment, the i'th flash input buffer further comprises an i'th latch selection counter that counts clock pulses in the i'th transfer control clock signal, except in the case where i is n, and that supplies i'th latch counting signals, in number of the Ni, which control data transfer operations of the i'th data latches.

In another embodiment, the flash interface further comprises: an output buffer that transfers data from the flash memory to output-buffer bus groups, which is in number of the Ni, in response to the n'th transfer control clock signal; and an output multiplexer that selects one of the output-buffer bus groups in sequence and provides data from the selected output-buffer bus group for the external system, in response to clock pulses in the first transfer control clock signal every Ni pulses.

In another embodiment, the output multiplexer comprises: an output multiplexer that selects one of the Ni output-buffer bus groups in sequence; and multiplexing counters that count clock pulses in the first transfer control clock signal and provide multiplexer-counting signals, in number of Ni, which select the output-buffer bus group.

In another aspect, the present invention is directed to a flash memory data storage apparatus that transceives data with an external system through a host bus group in parallel, comprising: a flash memory that transceives data through a flash bus group, a bus width (FW) of the flash bus group being greater than a bus width (HW) of the host bus group, where the bus width represents the number of bus lines that transceive data in parallel in response to a same clock signal; a buffer memory that temporarily stores transferred data; a host interface that controls data transmission between the host bus group and the buffer memory; and a flash interface that controls data transmission between the flash bus group and the buffer memory, wherein the flash interface includes first through n'th flash input buffers that transfer data to the host bus group in stages in response to first through n'th transfer control clock signals, where $n \geq 2$, and wherein an i'th flash input buffer, where $2 \leq i \leq n$, provides data through i'th input-buffer bus groups in number of at least Ni, wherein a bus width (IBWi) of each of the i'th input-buffer bus groups is wider than a bus width (IBWi−1) of each of an (i−1)'th input-buffer bus groups, wherein a period (Ti) of an i'th transfer control clock signal is longer than a period (Ti−1) of an (i−1)'th transfer control clock signal, and wherein Ni is obtained by dividing the FW by the IBW.

In one embodiment, the buffer memory comprises: first and second temporary storage units that each transceive data, which is composed of a bus width of the host bus group, with the host interface and the flash interface; and a buffering multiplexer that provides data of the host bus group from the host interface for an alternative one of the first and second temporary storage units, and that provides data from the first and second temporary storage units for an alternative one of the host interface and the flash interface.

In another embodiment, each of the first and second temporary storage units includes an SRAM storing data with a bus width (FW) of the flash bus group.

In another embodiment, the host interface comprises a chip selection multiplexer that provides first and second storage enable signals for the buffering multiplexer by de-multiplexing a chip enable signal provided from the external system in response to a selection address, the first storage enable signal controlling data to be provided from the external system for the first temporary storage unit, the second storage enable signal controlling data to be provided from the external system for the second temporary storage unit.

In another embodiment, the host interface further comprises a host output multiplexer that selects one of data groups provided from the first and second temporary storage units, and provides the selected data group for the external system.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
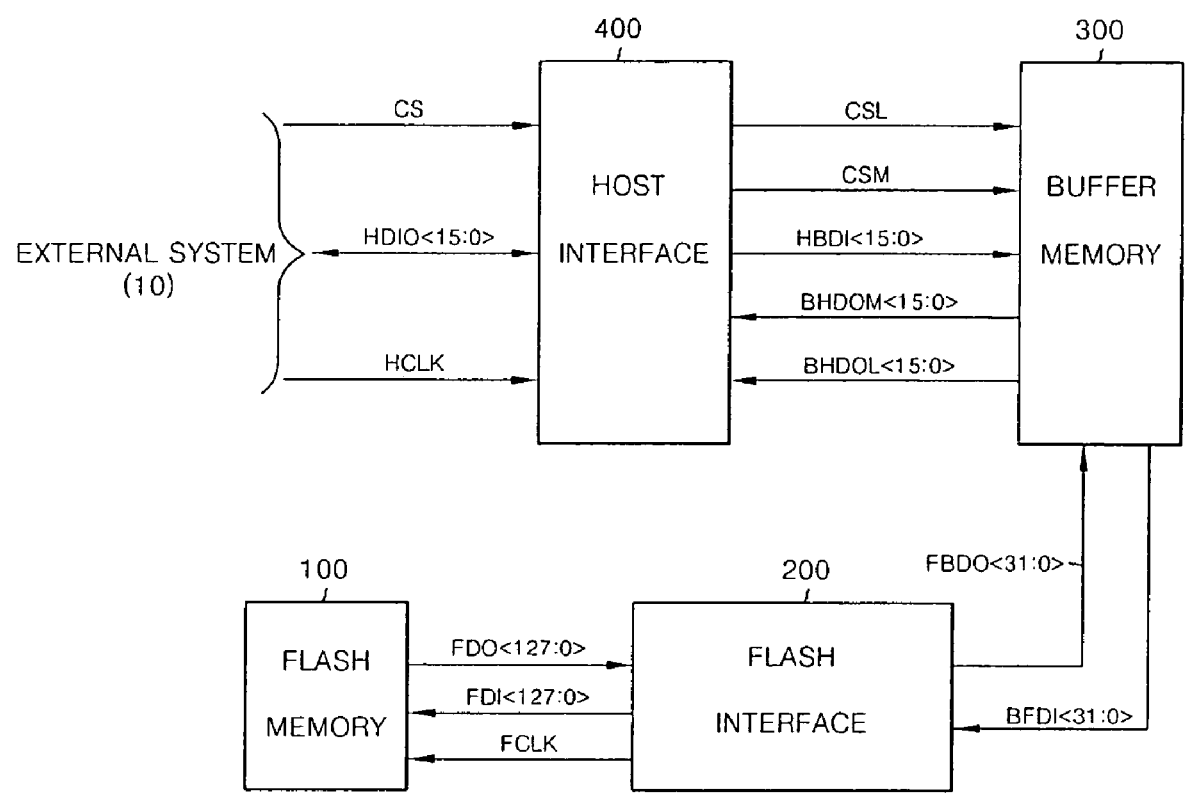
FIG. 1 is a block diagram illustrating a flash memory data storage apparatus according to a preferred embodiment of the present invention.

Preferred embodiments of the present invention will be described below in more detail with reference to the accompanying drawings. In the drawings, like numerals refer to like elements throughout the specification. The present invention may, however, be embodied in different forms and should not be constructed as limited to the embodiments set forth herein. Rather, these embodiments are provided so that this disclosure will be thorough and complete, and will fully convey the scope of the invention to those skilled in the art.

Hereinafter, an exemplary embodiment of the present invention will be described in conjunction with the accompanying drawings.

FIG. 1 is a block diagram illustrating a flash memory data storage apparatus according to a preferred embodiment of the present invention. Referring to FIG. 1, the flash memory data storage apparatus of the present invention embeds a NAND-type flash memory 100 therein and transceives data with an external system 10. The data transceiving operation between the flash memory data storage apparatus and the external system 10 is conducted by way of a host bus group HDIO<15:0> in response to a host clock signal HCLK.

In this embodiment, the host bus group HDIO<15:0> is configured with a bus width of 16 lines and associated with a host clock HCLK having a period of 10 ns. Here, the term "bus width" means the number of bus lines transmitting data in parallel in response to the specific clock pulse of the clock signal. Therefore, 16-bit data is able to be transceived every 10 ns between the external system 10 and a host interface 400.

Figure 2:
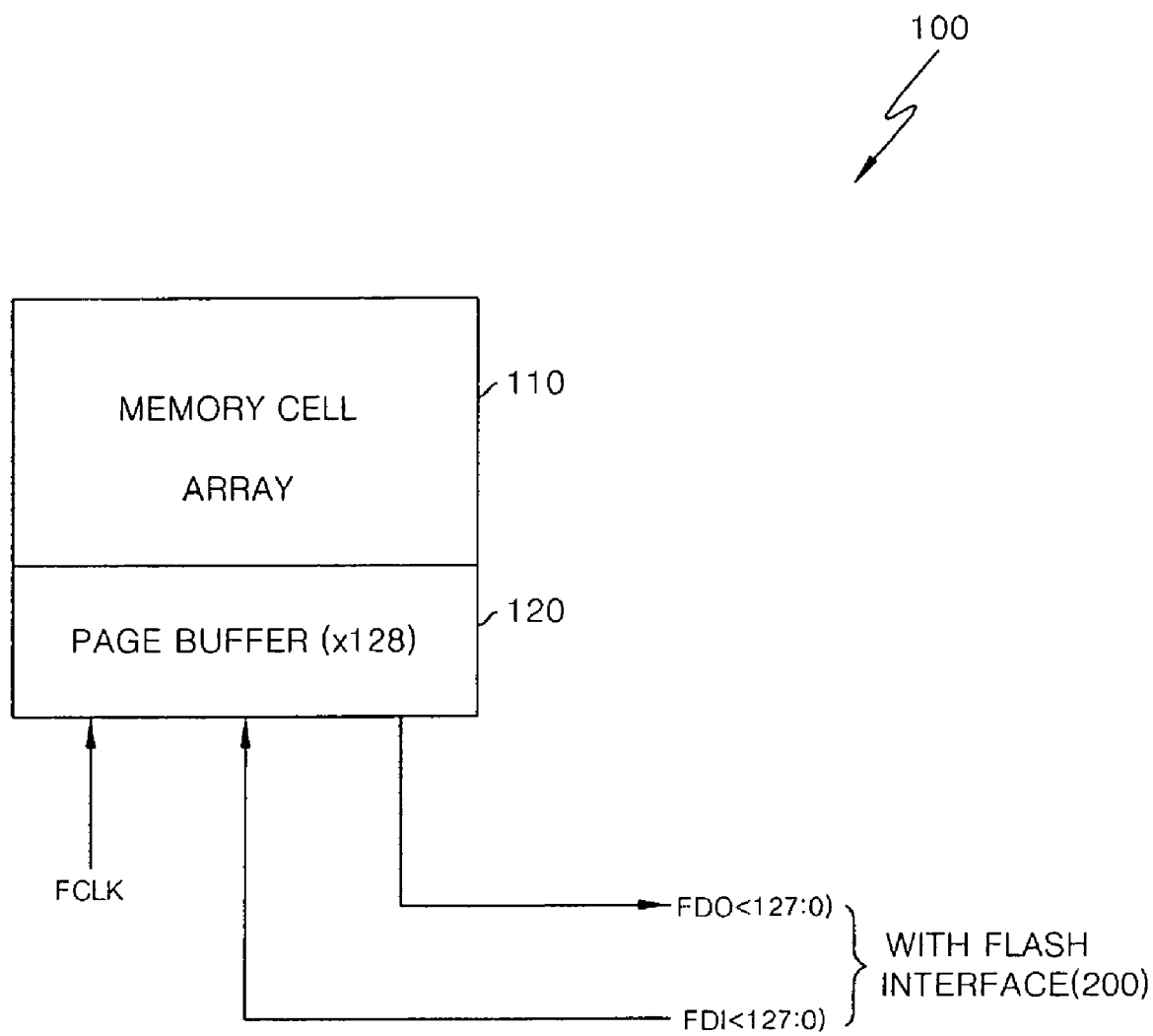
FIG. 2 is a block diagram illustrating a functional configuration of the flash memory shown in FIG. 1 in accordance with the present invention.

The flash memory 100, as illustrated in FIG. 2, includes a memory cell array 110 and a page buffer 120. The memory cell array 110 is constructed of flash memory cells (not shown) arranged in a NAND-type logical loop, in which pluralities of the flash memory cells are connected to a single, common string. Pluralities of data bits are input/output to/from the memory cell array 110, in parallel by way of the page buffer 120 in response to a clock.

In this embodiment, the flash memory 100 is configured to input and output 128-bit data in parallel by way of flash bus groups FDI<127:0> and FDO<127:0> in sync with a flash clock signal FCLK. The flash clock signal FCLK is operable in a period of 80 ns. Input data is transferred through the flash bus group FDI<127:0>, while output data is transferred through the flash bus group FDO<127:0>. Now, in this specification, for the convenience of description, the flash bus group FDI<127:0> for input and the flash bus group FDO<127:0> for output are generally referred to as "flash bus group". A bus width FW of the flash bus group FDI<127:0> or FDO<127:0> is 128-bit.

The bus width of the flash bus group FDI<127:0> or FDO<127:0>, FW, is wider than that of the host bus group HDIO, and a cycle period of the flash clock signal FCLK is longer than that of the host clock signal HCLK.

Meanwhile, the memory cell array 110 and the page buffer 120 may be implemented in various configurations, and their input/output operations are readily understood by those skilled in the art. Therefore, descriptions about their structures and operations will not be provided in detail.

Returning to FIG. 1, the flash memory data storage apparatus is comprised of the flash memory 100, a flash interface 200, a buffer memory 300, and a host interface 400.

The flash interface 200 is used for transceiving data between the flash bus group FDI<127:0> and FDO<127:0> and the buffer memory 300 in response to the flash clock signal FCLK. The flash interface 200 transceives data with the flash memory 100 by way of the flash bus group FDI<127:0> and FDO<127:0> each of which has the 128-bit bus width. The flash interface 200 also transfers data to the buffer memory 300 by way of a flash-buffer bus group FBDO<31:0>, and receives data from the buffer memory 300 by way of the buffer-flash bus group BFDI<31:0>. The bus width of each of the buffer-flash bus group BFDI<31:0> and the flash-buffer bus group FBDO<31:0> is 32-bits.

The buffer memory 300 temporarily stores data transceived between the flash interface 200 and the host interface 400. The buffer memory 300, as mentioned above, transceives data with the flash interface 200 by way of the flash-buffer bus group FBDO<31:0> and the buffer-flash bus group BFDI<31:0>.

The buffer memory 300 receives data from the host interface 400 through a host-buffer bus group HBDI<15:0>, and transfers data to the host interface 400 through first and second buffer-host bus groups BHDOM<15:0> and BHDOL<15:0>.

The host interface 400 controls data transmission between the host bus group HDIO<15:0> and the buffer memory 300.

Figure 3:
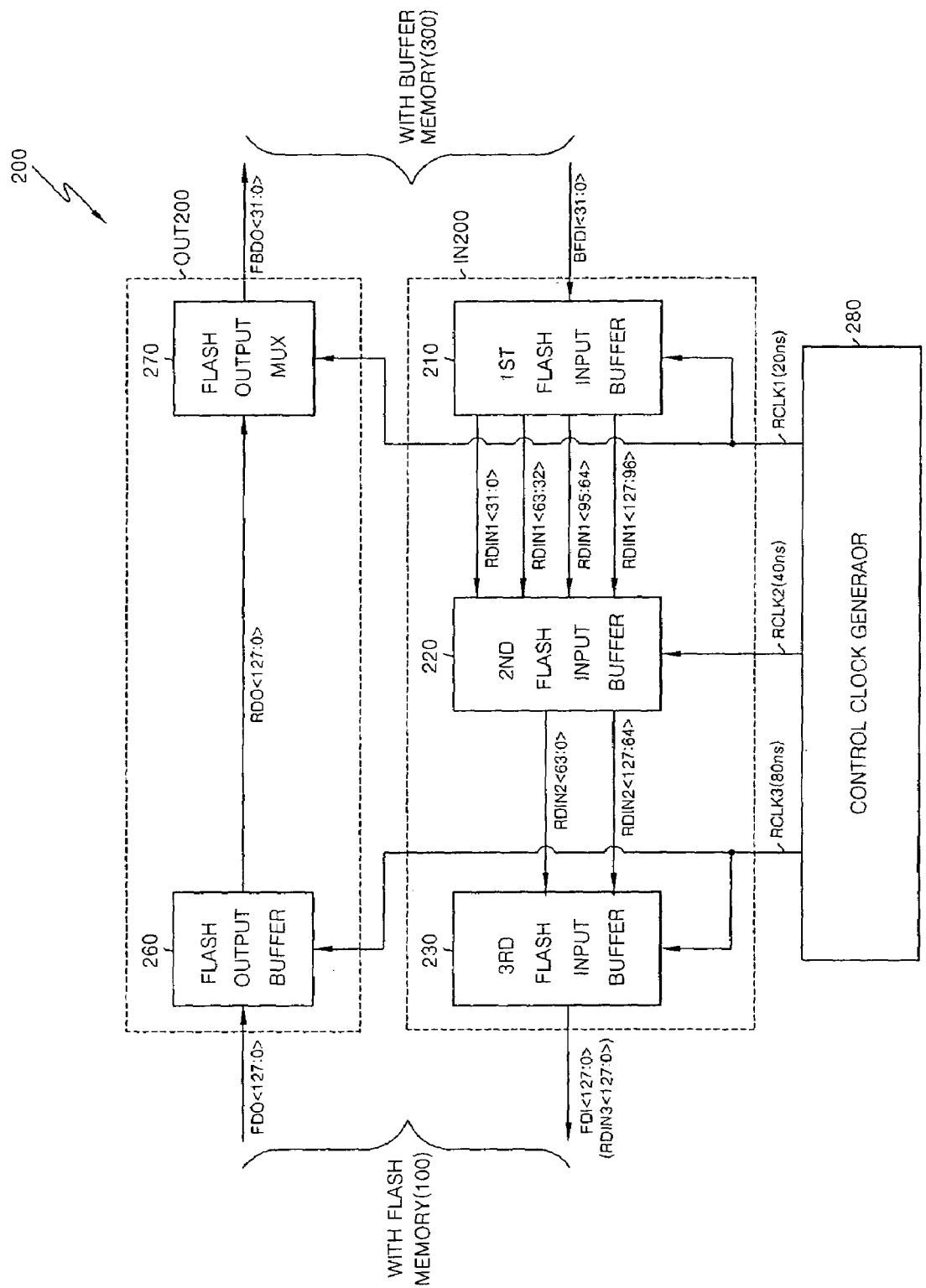
FIG. 3 is a detailed block diagram illustrating the configuration of the flash interface of FIG. 1, in accordance with the present invention.

FIG. 3 is a block diagram that illustrates a configuration of the flash interface 200 shown in FIG. 1 in detail. The flash interface 200 is comprised of first through n'th flash input buffers 210, 220, 230, . . . disposed on an input path IN200 at which data are transferred from the buffer memory 300 to the flash memory 100, the buffers carrying out a data transfer operation toward the flash memory from the buffer memory 300 in stages. Here, "n" is a positive integer larger than 2. For the convenience of description, the present example is embodied with first through third flash input buffers 210, 220, and 230 as being included in the flash interface 200.

The flash interface 200 is also comprised of a flash output buffer 260 and a flash output multiplexer 270 that are disposed on an output path OUT200 at which data are transferred from the flash memory 100 to the buffer memory 300.

The flash interface 200 further includes a control clock generator 280. Transfer control clock signals RCLK1~RCLKn are applied to the flash input buffers 210, 220, and 230, the flash output buffer 260, and the flash output multiplexer 270 from the control clock generator 280.

Figure 4:
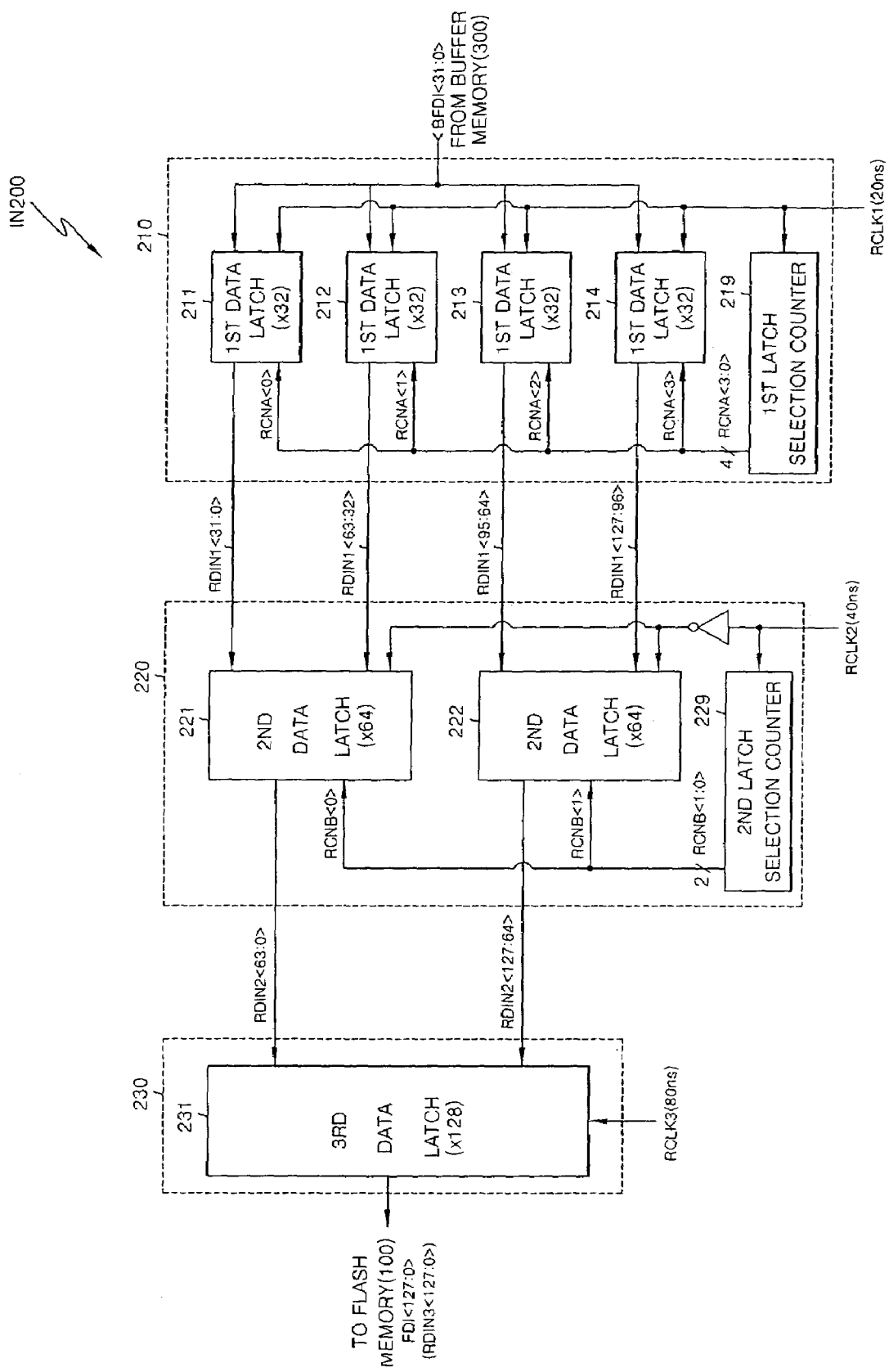
FIG. 4 is a block diagram illustrating the first through third flash input buffers of the input path of FIG. 3, in accordance with the present invention.

FIG. 4 is a block diagram illustrating the first through third flash input buffers 210, 220, and 230 included in the input path IN200 of FIG. 3.

Referring to FIG. 4, the first flash input buffer 210 includes first data latches 211~214 in number of four, and a first latch selection counter 219. The first data latches 211~214 provide data respectively for first input-buffer bus groups RDIN1<31:0>, RDIN1<63:32>, RDIN1<95:64>, and RDIN1<127:96> in response to four sequential clock pulses in the first transfer control clock signal RCLK1, respectively. The first latch selection counter 219 generates first latch counting signals RCNA0~RCNA3 in number of four, counting the number of clock pulses in the first transfer control clock RCLK1. The first latch counting signals RCNA0~RCNA3 control data transfer operations respective to the first data latches 211~214.

The second flash input buffer 220 includes second data latches 221 and 222 in number of two, and a second latch selection counter 229. The second data latches 221 and 222 provide data respectively for second input-buffer bus groups RDIN2<63:0> and RDIN1<127:64> in response to two sequential clock pulses in the second transfer control clock signal RCLK2, respectively. The second latch selection counter 229 generates second latch counting signals RCNB0 and RCNB1 in number of four, counting the number of clock pulses in the second transfer control clock RCLK2. The second latch counting signals RCNB0 and RCNB1 control data transfer operations respective to the second data latches 221 and 222.

The third flash input buffer 230 includes a third data latch 231. The third data latch 231 provides data for a third input-buffer bus group RDIN3<127:0> at every pulse of the third transfer control signal RCLK3.

Throughout this exemplary embodiment of the invention, clock periods of the first through third transfer control clock signals RCLK1~RCLK3 are 20 ns, 40 ns, and 80 ns, respectively. Also, bus widths IBW1~IBW3 of the first through third input-buffer bus groups RDIN1~RDIN3 are 32-bit, 64-bit, and 128-bit, respectively.

Generalizing this embodiment with an i'th flash input buffer (here, $2 \leq i \leq n$), the i'th flash input buffer provides data at least through the i'th input-buffer bus groups RDINi in number of Ni. A bus width IBWi of the i'th input-buffer bus group RDINi is wider than a bus width IBW(i−1) of the (i−1)'th input-buffer bus group RDIN(i−1) lead from the (i−1)'th flash input buffer. The clock period Ti of the i'th transfer control clock signal RCLKi is longer than the clock period T(i−1) of the (i−1) transfer control clock signal RCLK(i−1). Also, the number of the i'th input-buffer bus groups, Ni, is obtained from dividing the bus width FW of the flash bus group FDI<127:0> by the bus width IBWi of the i'th input-buffer bus group RDINi, i.e., Ni=FW/IBWi.

Preferably, the bus width IBWi of the i'th input-buffer bus group RDINi is twice the bus width IBW(i−1) of the (i−1)'th input-buffer bus group RDIN(i−1).

It is also preferred for the clock period Ti of the i'th transfer control clock signal RCLKi to be twice the clock period T(i−1) of the (i−1)'th transfer control clock signal RCLK(i−1).

Meanwhile, the n'th input-buffer bus group RDINn corresponds to the flash bus group FDI<127:0> and the n'th transfer control clock signal RCLKn corresponds to the flash clock signal FCLK. In this embodiment, the third input-buffer bus group RDIN3 corresponds to the flash bus group FDI<127:0> and the third transfer control clock signal RCLK3 corresponds to the flash clock signal FCLK.

Figure 5:
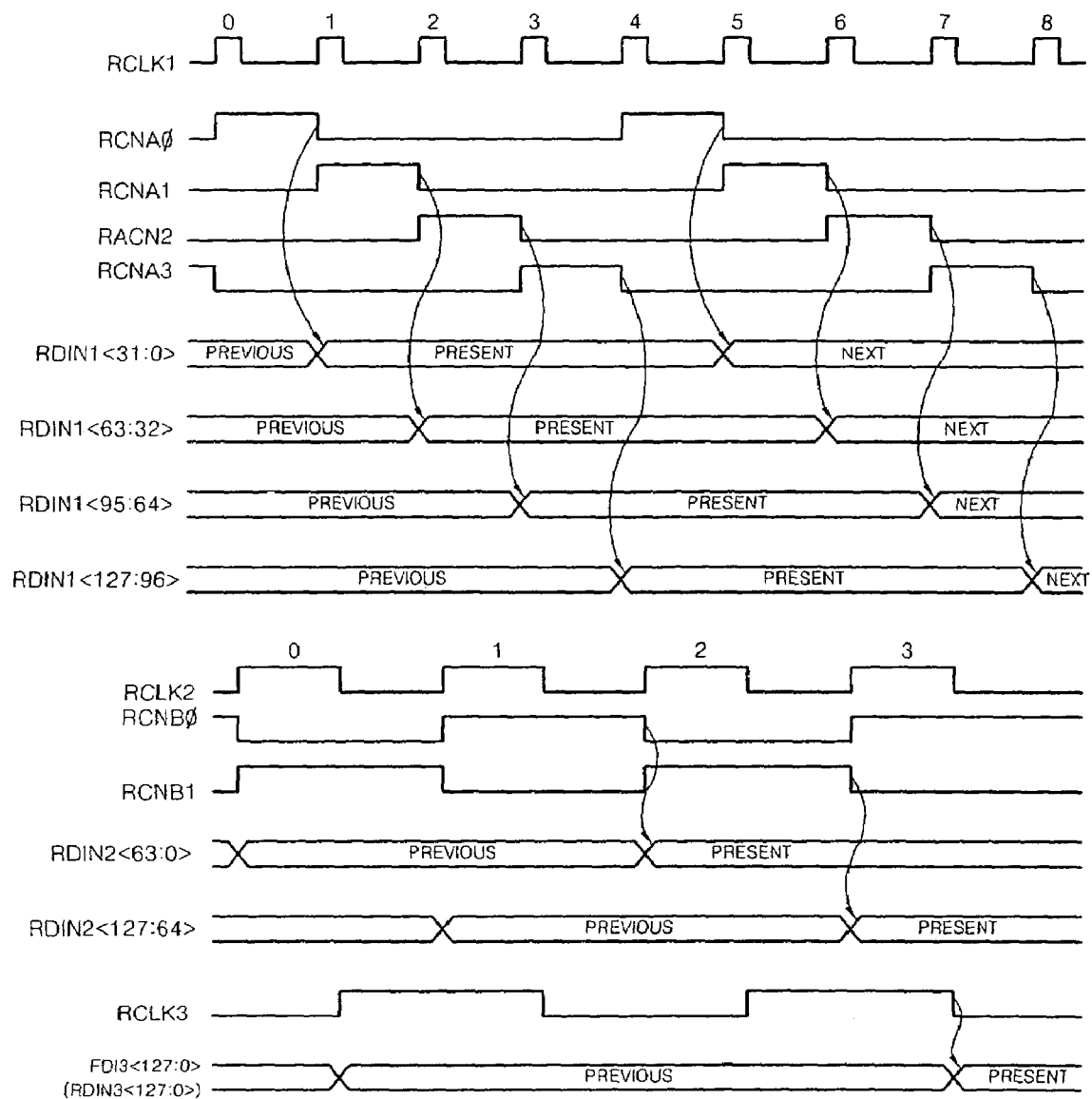
FIG. 5 a timing diagram illustrating a procedure of transferring data by means of the first through third flash input buffers of FIG. 4, in accordance with the present invention.

FIG. 5 a timing diagram illustrating a procedure of transferring data by means of the first through third flash input buffers 210, 220, and 230 shown in FIG. 4.

First, regarding the first through third transfer control clock signals RCLK1~RCLK3 in FIG. 5, the clock period of the first transfer control clock signal RCLK1 is one-half (½) of the clock period of the second transfer control clock signal RCLK2, while the clock period of the third transfer control clock signal RCLK3 is twice the clock period of the second transfer control clock signal RCLK2. In other words, when the clock period of the second transfer control clock signal RCLK2 is 40 ns, the clock periods of the first and second transfer control clock signals RCLK1 and RCLK3 are 20 ns and 80 ns, respectively.

Further, the second transfer control clock signal RCLK2 rises or falls in response to a falling edge of the first transfer control clock signal RCLK1. In addition, the third transfer control clock signal RCLK3 rises or falls in response to the falling edge of the second transfer control clock signal RCLK2.

As illustrated in FIG. 5, the first through third transfer control clock signals RCLK1~RCLK3 are provided from the control clock generator 280 (see FIG. 3, above), a description of which will be provided below in conjunction with FIGS. 8 through 11.

Retuning to FIG. 5, the first latch selection counter 219 (refer to FIG. 4) generates the four first latch counting signals RCNA0~RCNA3, by counting the number of clock pulses in the first transfer control clock signal RCLK1. In other words, the first latch counting signals RCNA0~RCNA3 are each activated in response to sequential four clock pulses in the first transfer control clock signal RCLK1. In this manner, each of the first latch counting signals becomes active every four clock cycles of the first transfer control clock signal RCLK1. In more detail, the first latch counting signal RCNA0, controlling the first data latch 211 at the top of FIG. 4, is activated in response to clock-pulse-0 and clock-pulse-4 and inactivated in response to clock-pulse-1 and clock-pulse-5, of the first transfer control clock signal RCLK1. The first data latch 211 holds data, which is transferred from the buffer memory 300, in response to a rising edge of every clock pulse in the first transfer control clock signal RCLK1. The data held in the first data latch 211 is transferred to the first input-buffer bus group RDIN1<31:0>, corresponding thereto, in response to a falling edge of the first latch counting signal RCNA0. Then, the first input-buffer bus group RDIN1<31:0> transfers the latched data to the second data latch 221 in response to the clock-pulse-1 and clock-pulse-5 of the first transfer control clock signal RCLK1.

In the same manner, the first input-buffer bus group RDIN1<63:32> transfers data to the second data latch 221 from the first data latch 212 in response to clock-pulse-2 and clock-pulse-6 of the first transfer control clock signal RCLK1. The first input-buffer bus group RDIN1<95:64> transfers data to the second data latch 222 from the first data latch 213 in response to clock-pulse-3 and clock-pulse-7 of the first transfer control clock signal RCLK1. Also, the first input-buffer bus group RDIN1<127:96> transfers the data to the second data latch 222 from the first data latch 213 in response to clock-pulse-4 and clock-pulse-8 of the first transfer control clock signal RCLK1.

As a result, the first input-buffer bus groups RDIN1<31:0>, RDIN1<63:32>, RDIN1<95:64>, and RDIN1<127:96> transfer all of the 128-bit data to the second data latches 221 and 222 from the buffer memory 300 in an 80 ns (4*20 ns) period.

Continuing to refer to FIG. 5, the second latch selection counter 229 (see FIG. 4) generates the two second latch counting signals RCNB0 and RCNB1 by counting the number of clock pulses in the second transfer control clock signal RCLK2. In other words, the second latch counting signals RCNB0 and RCNB1 are each activated in response to two sequential clock pulses in the second transfer control clock signal RCLK2. This means that each of the second latch counting signals becomes active every two clock cycles of the second transfer control clock signal RCLK2. In more detail, the second latch counting signal RCNB0, controlling the second data latch 221, is activated in response to clock-pulse-1 and clock-pulse-3 and inactivated in response to clock-pulse-2 and clock-pulse-4, of the second transfer control clock signal RCLK2. The second data latch 221 holds data, which is transferred from the buffer memory 300, in response to a falling edge of every clock pulse in the second transfer control clock signal RCLK2. The data held in the second data latch 221 is transferred to the second input-buffer bus group RDIN2<63:0>, corresponding thereto, in response to a falling edge of the first latch counting signal RCNB0. Then, the second input-buffer bus group RDIN2<63:0> transfers the latched data to the third data latch 231 in response to clock-pulse-2 and clock-pulse-4 of the second transfer control clock signal RCLK2. In this embodiment, the second data latch 221 is controlled to be operable in response to a falling edge of the second transfer control signal RCLK2, which prevents a data transmission error even when there is a skew between the first and second transfer control signals RCLK1 and RCLK2.

The second input-buffer bus group RDIN2<127:64> transfers data to the third data latch 231 from the second data latch 222 in response to clock-pulse-3 and clock-pulse-5 of the second transfer control clock signal RCLK2.

As a result, the second input-buffer bus groups RDIN2<63:0> and RDIN2<127:64>, transfer all the 128-bit data to the third data latch 231 from the first data latches 211~214 in 80 ns (4*20 ns).

Also, further referring to FIG. 5, the third data latch 231 transfers its latched data to the third input-buffer bus group RDIN2<127:0> in response to a falling edge of each pulse of the third transfer control clock signal RCLK3. As a result, the third input-buffer bus groups RDIN2<127:0> transfer all the 128-bit data to the flash memory 100 from the second data latches 221 and 222 in 80 ns that is the clock period of the third transfer control clock signal RCLK3 (i.e., the flash clock signal FCLK).

In summary, by way of the flash interface 200 including the first through third flash input buffers 210, 220, and 230, data provided from the buffer memory 300 by groups of 32 bits every 20 ns is transferred to the flash memory 100 by groups of 128 bits every 80 ns.

Figure 6:
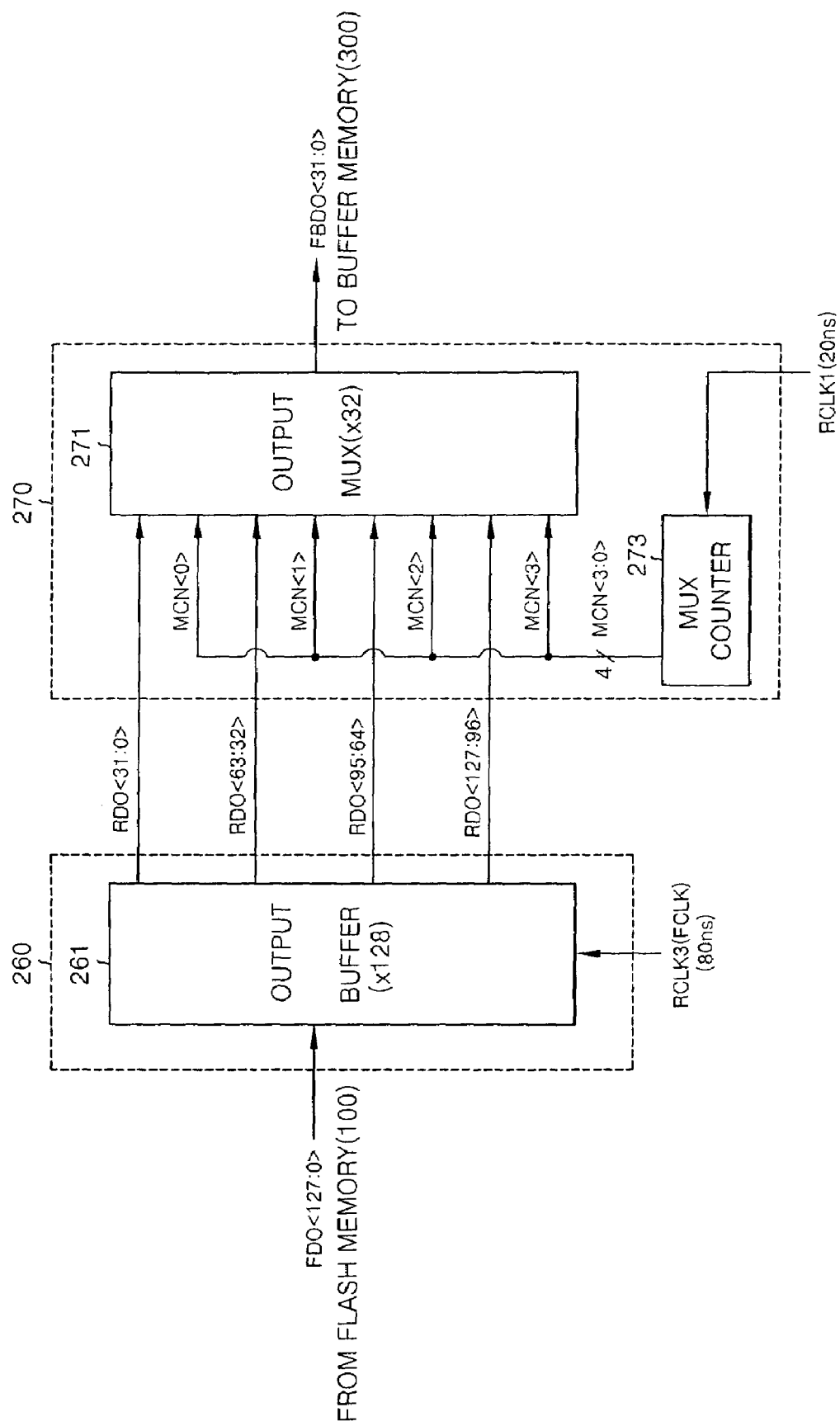
FIG. 6 is a detailed block diagram of the flash output buffer and multiplexer included in an output path of FIG. 3, in accordance with the present invention.
Figure 7:
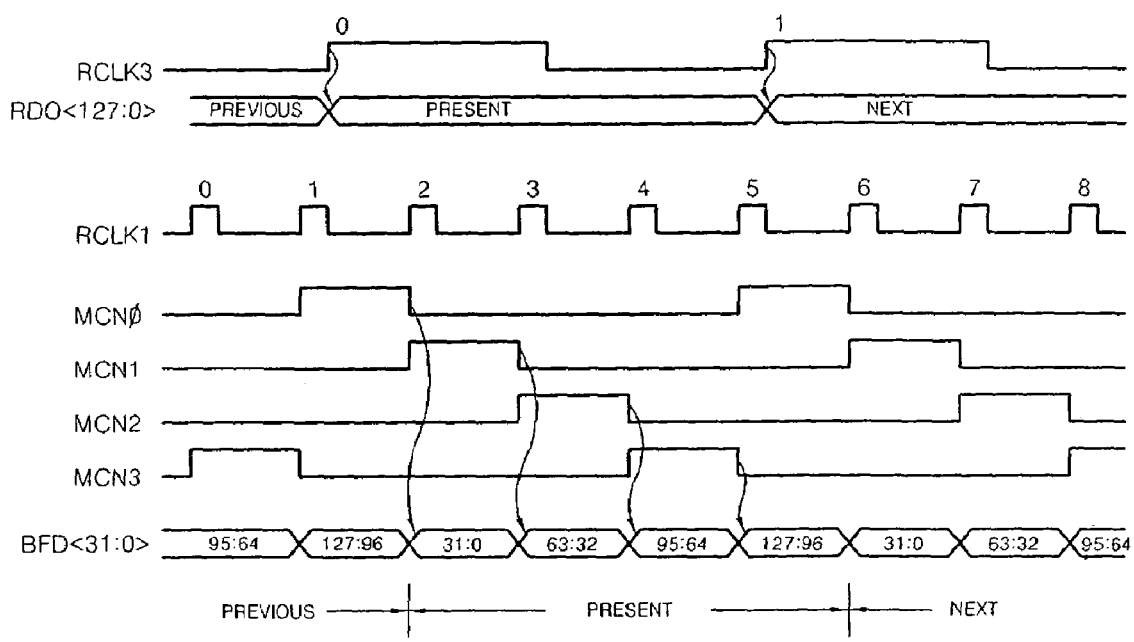
FIG. 7 is a timing diagram illustrating a procedure of transferring data by means of the flash output buffer and multiplexer of FIG. 6, in accordance with the present invention.

FIG. 6 is a block diagram illustrating the flash output buffer 260 and the flash output multiplexer (MUX) 270, which are included in the output path OUT200 of FIG. 3, in detail. FIG. 7 is a timing diagram illustrating a procedure of transferring data by means of the flash output buffer and multiplexer, 260 and 270, shown in FIG. 6.

Referring to FIGS. 6 and 7, the flash output buffer 260 is comprised of an output buffer 261. The output buffer 261 transfers data from the flash memory 100 to output-buffer bus groups, RDO<31:0>, RDO<63:32>, RDO<95:64>, and RDO<127:96>, through the flash bus group FDO<127:0> in response to the flash clock signal FCLK that is the first transfer control clock signal RCLK3. In other words, the output buffer 261 sends the 128-bit data from the flash memory 100 to the flash output multiplexer 270 through the output-buffer bus groups RDO<31:0>, RDO<63:32>, RDO<95:64>, and RDO<127:96>.

The flash output multiplexer 270 is comprised of an output multiplexer 271 and a multiplexing counter 273. The multiplexing counter 273 counts clock pulses in the first transfer control clock signal RCLK1 and then generates four multiplexer-counting signals MCN0~MCN3. In other words, the multiplexer-counting signals MCN0~MCN3 are activated in response to four sequential clock pulses in the first transfer control clock signal RCLK1. in this manner, each multiplexer-counting signal becomes active every four clock cycles of the first transfer control clock signal RCLK1. For instance, the multiplexer-counting signals MCN is activated in response to clock-pulse-1 and clock-pulse-5, and inactivated in response to clock-pulse-2 and clock-pulse-6, of the first transfer control clock signal RCLK1.

The output multiplexer 271 responds to every fourth clock pulse of the first transfer control clock signal RCLK1 to select one of the output-buffer bus groups RDO<31:0>, RDO<63:32>, RDO<95:64>, and RDO<127:96> in order. In addition, the output multiplexer 271 functions to selectively provide data from the output-buffer bus groups RDO<31:0>, RDO<63:32>, RDO<95:64>, and RDO<127:96> for the external system 10 through the buffer memory 300.

In detail, the output multiplexer 271 transfers data from the output-buffer bus group RDO<31:0> to the flash-buffer bus group FBDO<31:0> in response to a falling edge of the multiplexer-counting signal MCN0. That is, as shown in FIG. 7, the output multiplexer 271 transfers data from the output-buffer bus group RDO<31:0> to the flash-buffer bus group FBDO<31:0> in response to clock-pulse-2 and clock-pulse-6 of the first transfer control clock signal RCLK1.

Similarly, the output multiplexer 271 transfers data from the output-buffer bus group RDO<63:32> to the flash-buffer bus group FBDO<31:0> in response to clock-pulse-3 and clock-pulse-7 of the first transfer control clock signal RCLK1. The output multiplexer 271 transfers data from the output-buffer bus group RDO<95:64> to the flash-buffer bus group FBDO<31:0> in response to clock-pulse-4 and clock-pulse-8 of the first transfer control clock signal RCLK1. Also, the output multiplexer 271 transfers data from the output-buffer bus group RDO<127:96> to the flash-buffer bus group FBDO<31:0> in response to clock-pulse-5 and clock-pulse-9 of the first transfer control clock signal RCLK1.

As a result, the output multiplexer 271 transfers the data from the four output-buffer bus groups RDO<31:0>, RDO<63:32>, RDO<95:64>, and RDO<127:96> to the flash-buffer bus group FBDO<31:0> in sequence in an 80 ns (4*20 ns) period.

Figure 8:
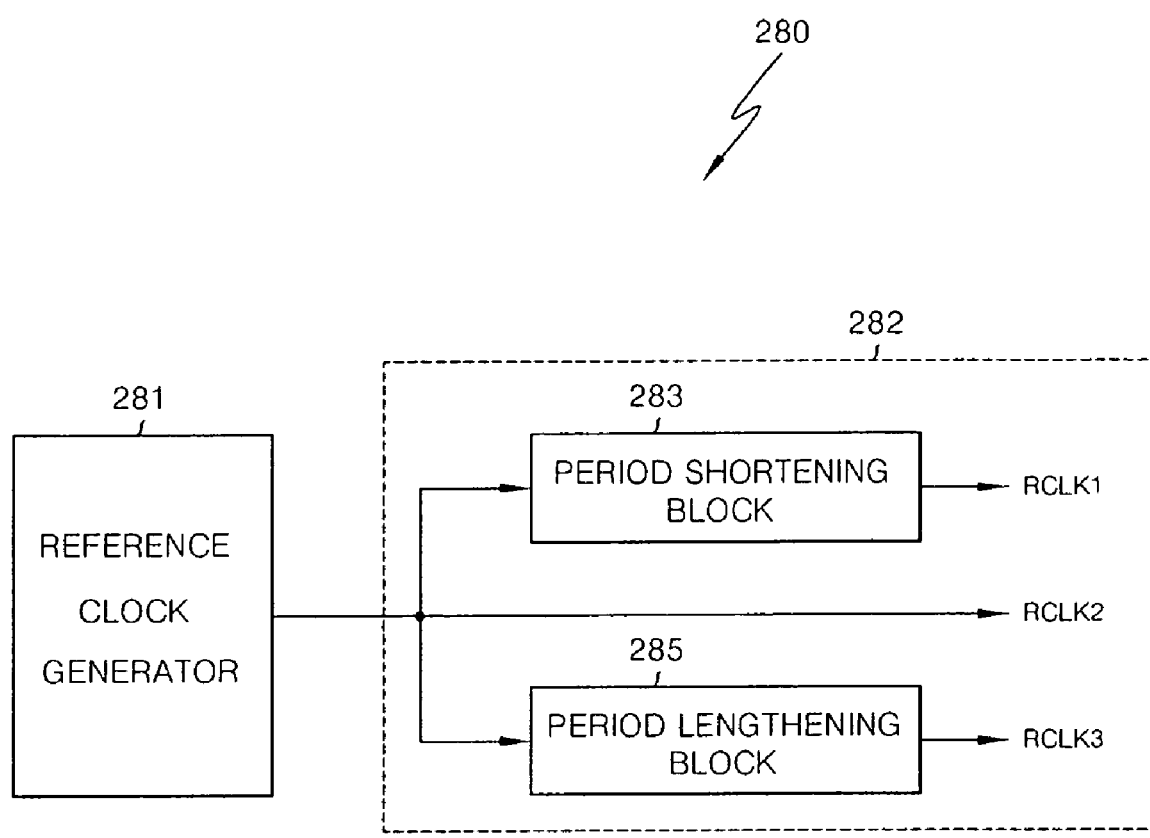
FIG. 8 is a block diagram illustrating the control clock generator of FIG. 3, in accordance with the present invention.

FIG. 8 is a block diagram illustrating the control clock generator 280 shown in FIG. 3. The first through n'th transfer control clock signals RCLK1~RCLKn, as stated above, are generated from the control clock generator 280. Referring to FIG. 8, the control clock generator 280 is comprised of a reference clock generator 281 and a period modulator 282. The reference clock generator 281 functions to generate the j'th transfer control clock signal. Preferably, the number j is (n+1)/2 (if n is an odd number) or n/2 (if n is an even number). In the exemplary embodiment described herein, j is equal to 2 such that the reference clock generator 281 generates the second transfer control clock signal RCLK2. The reference clock generator 281 may, for example, be implemented with a ring oscillator. As the structure and operation of such a clock generator is well known by those skilled in the art, the reference clock generator 281 will not be described herein in detail.

The period modulator 282 changes the period of the second transfer control clock signal RCLK2 and provides the modulated period for the first and third transfer control clock signals RCLK1 and RCLK3. The period modulator 282 is comprised of a period shortening block 283 to generate the first transfer control clock signal RCLK1, and a period lengthening block 285 to generate the third transfer control clock signal RCLK3.

Figure 9:
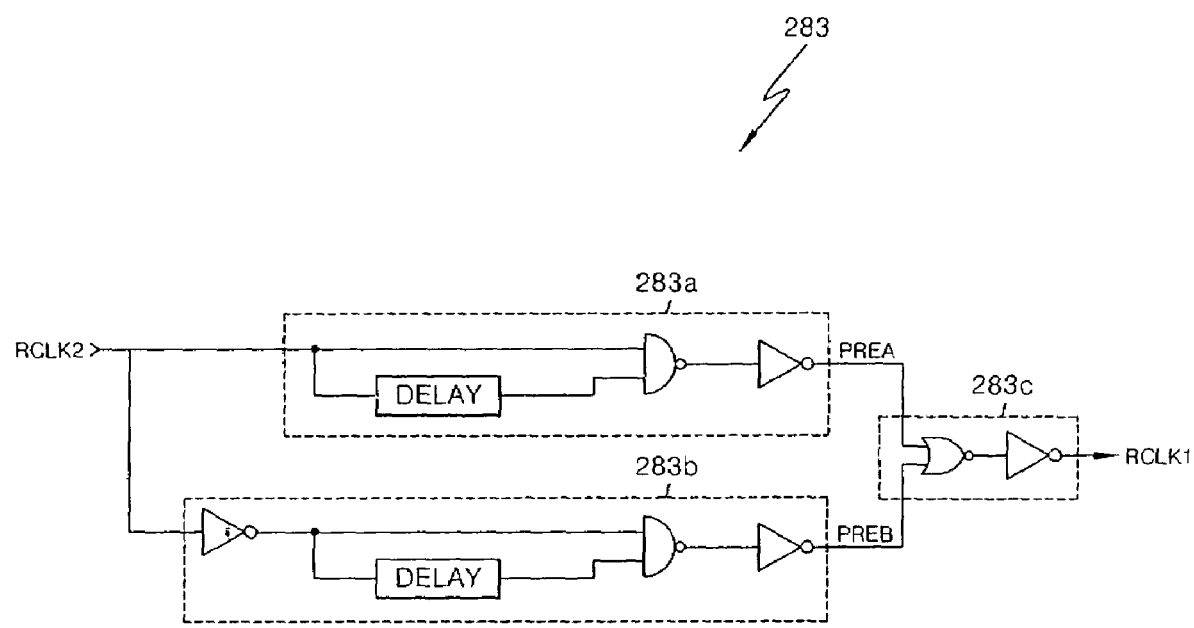
FIG. 9 is a detailed circuit diagram of the period shortening block of FIG. 8, in accordance with the present invention.

FIG. 9 is a circuit diagram illustrating the period shortening block 283 shown in FIG. 8 in more detail. As shown in FIG. 9, the period shortening block 283 includes a rising-edge detector 283a, a falling-edge detector 283b, and an ORing circuit 283c.

The rising-edge detector 283a generates a pulse signal upon detecting a rising edge of the second transfer control clock signal RCLK2. In other words, a rising edge of the output signal PREA of the rising-edge detector 283a is generated after a predetermined delay time in response to a rising edge of the second transfer control clock signal RCLK2 (refer to tA1 of FIG. 11). Otherwise, a falling edge of the output signal PREA of the rising-edge detector 283a is generated in response to a falling edge of the second transfer control clock signal RCLK2 without delay (refer to tA2 of FIG. 11).

The falling-edge detector 283b generates a pulse signal upon detecting a falling edge of the second transfer control clock signal RCLK2. In other words, a rising edge of the output signal PREB of the falling-edge detector 283b is generated after a predetermined delay time in response to a falling edge of the second transfer control clock signal RCLK2 (refer to tB1 of FIG. 11). Otherwise, a falling edge of the output signal PREB of the falling-edge detector 283b is generated in response to a rising edge of the second transfer control clock signal RCLK2 without delay (refer to tB2 of FIG. 11).

The ORing circuit 283c performs a logical summation of the output signals, PREA and PREB, of the rising-edge and falling-edge detectors, 283a and 283b, and then generates the logical sum as the first transfer control clock signal RCLK1. Therefore, it can be seen that the first transfer control clock signal RCLK1 has a period of one-half that of the second transfer control clock signal RCLK2, and the first transfer control clock signal RCLK1 shown in FIG. 11 is the same with that shown in FIGS. 5 and 7.

Figure 10:
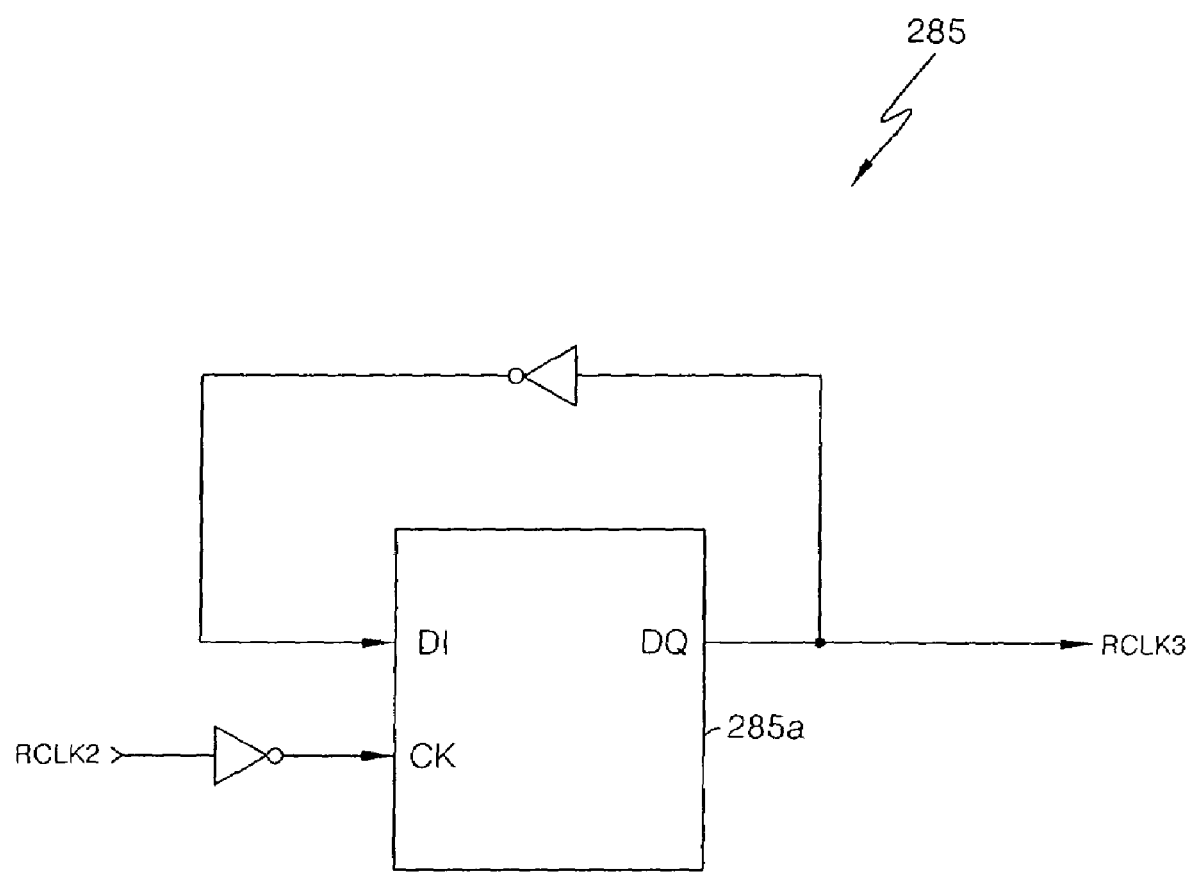
FIG. 10 is a detailed circuit diagram of the period lengthening block of FIG. 8, in accordance with the present invention.

FIG. 10 is a circuit diagram illustrating the period lengthening block 285 shown in FIG. 8. The period lengthening block 285 comprises a D-flipflop 285a that receives at a clock input port CK an inverted second transfer control clock signal RCLK2, and generating the third transfer control clock signal RCLK3 at an output port DQ thereof. The D-flipflop 285a receives a data input Dl that is an inverted third transfer control clock signal RCLK3.

Figure 11:
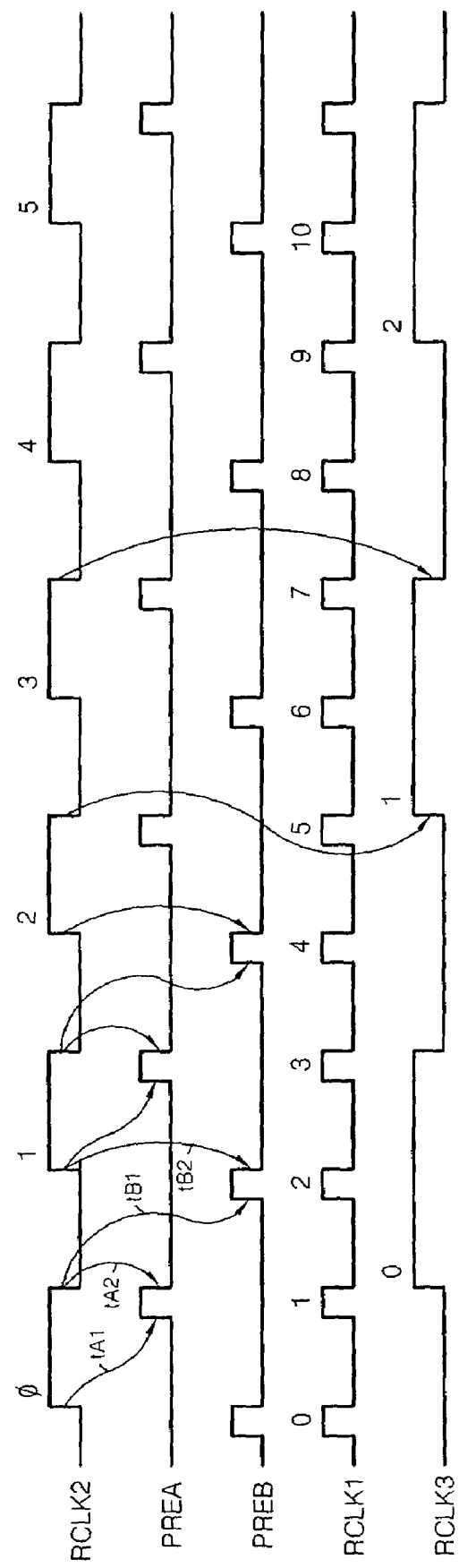
FIG. 11 is a timing diagram of operating signals used in the circuits FIGS. 8 though 10, illustrating a procedure of generating first through third control clock signals, in accordance with the present invention.

Therefore, the third transfer control clock signal RCLK3 repeats logical transitions in response to falling edges of the second transfer control clock signal RCLK2, as illustrated in FIG. 11. Thus, it can be seen that the period of the third transfer control clock signal RCLK3 is twice that of the second transfer control clock signal RCLK2, and the third transfer control clock signal RCLK3 shown in FIG. 11 is the same as that shown in FIGS. 5 and 7.

Figure 12:
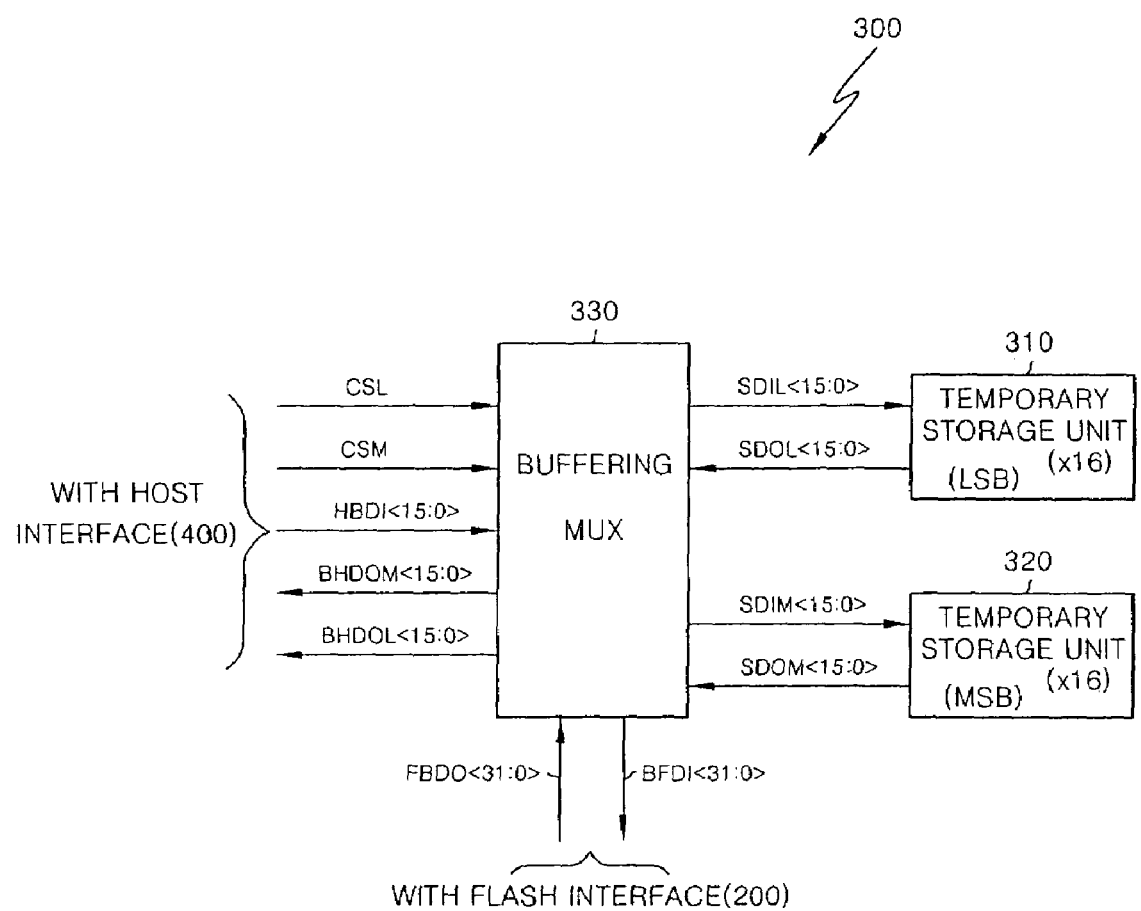
FIG. 12 is a detailed block diagram illustrating the buffer memory of FIG. 1, in accordance with the present invention.

FIG. 12 is a block diagram illustrating the buffer memory 300 of FIG. 1 in detail. Referring to FIG. 12, the buffer memory 300 is comprised of first and second temporary storage units 310 and 320, and a buffering multiplexer 330.

The first and second temporary units 310 and 320 provide data, which is consistent with the bus width (i.e., 16-bit) of the host bus group HDIO<15:0>, for the host interface 400 and the flash interface 200 in parallel. In one example, the first and second temporary storage units 310 and 320 comprise SRAM unit that are capable of storing the data of a width that is consistent with the bus width FW of the flash bus group FDIO<15:0>.

The buffering multiplexer 330 selectively provides data of the host bus group HDIO<15:0>, which is provided from the host interface 200, for an alternative one of the first and second temporary storage units 310 and 320. In addition, the buffering multiplexer 330 provides data for an alternative one of the host interface 400 and the flash interface 200 from the first and second temporary storage units 310 and 320.

A detailed operation of the buffering multiplexer 330 will now be described.

The buffering multiplexer 330 receives data from the host interface 400 through the host-buffer bus group HBDI<15:0>. The data of the host interface 400, which is applied thereto, is provided for a selective one of the first and second temporary storage units 310 and 320 by first and second storage enable signals CSL and CSM. In other words, when the first storage enable signal CSL is active, the data of the host interface 400 is transferred to the first temporary storage unit 310 through a first SRAM storage bus group SDIL<15:0>. When the second storage enable signal CSM is active, the data of the host interface 400 is transferred to the second temporary storage unit 320 through a second SRAM storage bus group SDIM<15:0>.

The data of the flash-buffer bus group FBDO<31:0>, which is provided from the flash interface 200, are stored in the first and second temporary storage units 310 and 320 as two portions, each comprising 16 bits.

Further, the buffering multiplexer 330 receives data from the first and second temporary storage units 310 and 320 respectively through the first and second SRAM output bus groups SDOL<15:0> and SDOM<15:0>. The data of the first and second temporary storage units 310 and 320 is provided for the buffer-flash bus group BFDI<31:0> during a data input operation, and is provided for the buffer-host bus groups BHDOM<15:0> and BHDOL<15:0> during a data output operation.

As such, the buffer memory 300 is able to transceive 32-bit data in parallel with the flash interface 200. The buffer memory 300 also receives 16-bit data from the host interface 400 in parallel, and transmits 32-bit data to the host interface 400 in parallel.

Figure 13:
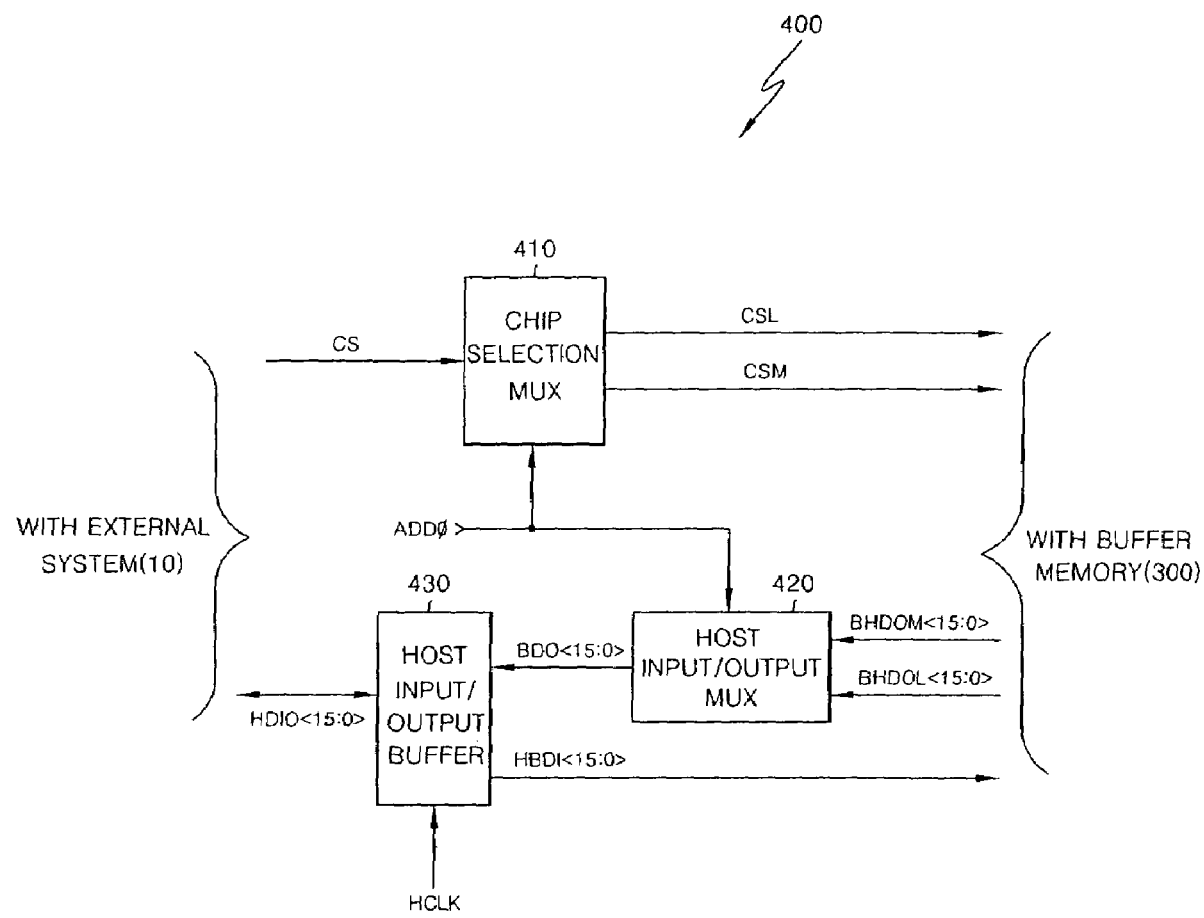
FIG. 13 is a detailed block diagram illustrating the host interface of FIG. 1, in accordance with the present invention.

FIG. 13 is a block diagram illustrating the host interface 400 of FIG. 1 in detail. Referring to FIG. 13, the host interface 400 includes a chip selection multiplexer 410, a host output multiplexer 420, and a host input/output buffer 430.

The chip selection multiplexer 410 generates the first and second storage enable signals, CSL and CSM, by de-multiplexing a chip enable signal CS provided by the external system 10, in response to a predetermined selection address ADD0. The first and second storage enable signals CSL and CSM are applied to the buffering multiplexer 330, each controlling selection of the first and second temporary storage units 310 and 320.

The host output multiplexer 420 selects one of data groups provided from the first and second temporary storage units 310 and 320 in response to the selection address ADD0. The selected data group by the host output multiplexer 420 is transferred to the external system 10 through a common output bus group BDO<15:0>.

The host input/output buffer 430 buffers data provided from the external system 10 through the host bus group HDIO<15:0>, and then provides the buffered data for the buffer memory 300. The host input/output buffer 430 further buffers data of the buffer memory 300, which is provided through the common output bus group BDO<15:0>, and then provides the buffered data to the external system through the host bus group HIO<15:0>.

By way of the above-described host interface 400, the n-bit data, for example 16-bit data, of the external system 10 can be transceived (transmitted and/or received) in parallel with the data storage apparatus.

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

As an example, the embodiment of the invention conducts the data transceiving operation between the flash memory and the external system through the buffer memory. But, it would be understood that such a data transceiving operation can be conducted between the flash memory and the external system even without the buffer memory.

As aforementioned, the flash memory data storage apparatus according to the present invention is comprised of multiple-stage flash input buffers, in which the data bus width is gradually enlarged and a cycle period of a control clock is gradually lengthened. For example, this configuration enables 16-bit data to be transceived in a period of 20 ns while permitting a parallel accessing operation of 128-bit data for the embedded flash memory in a period of 80 ns. Hence, the present invention is advantageous for improving a transfer speed (or data rate) of data between an external system and a flash memory embedded in a flash memory data storage apparatus.

What is claimed is:

1. A flash memory data storage apparatus that transceives data with an external system through a host bus group in parallel, comprising:
   a flash memory that transceives data through a flash bus group, a bus width (FW) of the flash bus group being greater than a bus width (HW) of the host bus group, where the bus width (FW) of the flash bus group and the bus width (HW) of the host bus group each represents a number of bus lines that transceive data in parallel in response to a same clock signal; and
   a flash interface that controls a data transmission operation between the flash bus group and the host bus group, wherein the flash interface includes first through n'th flash input buffers that transfer data to the flash memory in stages in response to first through n'th transfer control clock signals, where $n \geq 2$, wherein, in a stage of the stages, an i'th flash input buffer of the first through n'th flash input buffers, where $2 \leq i \leq n$, receives data from an (i−1)'th flash input buffer, and provides data through i'th input-buffer bus groups to the flash memory in number of at least Ni, wherein a bus width (IBWi) of each of the i'th input-buffer bus groups is wider than a bus width (IBWi−1) of each of (i−1)'th input-buffer bus groups, wherein the first through n'th transfer control clock signals comprise an (i−1)'th transfer control clock signal and an i'th transfer control clock signal that is the (i-1)'th transfer control clock signal having a lengthened period, wherein a period (Ti) of the i'th transfer control clock signal applied to the i'th flash input buffer is longer than a period (Ti−1) of the (i−1)'th transfer control clock signal applied to the (i−1)'th flash input buffer, and wherein the Ni is obtained by dividing the bus width (FW) of the flash bus group by the bus width (IBWi) of the each of the i'th input-buffer bus groups.

2. The flash memory data storage apparatus as set forth in claim 1, wherein the bus width (IBWi) is twice the bus width (IBWi−1).

3. The flash memory data storage apparatus as set forth in claim 2, wherein the period (Ti) is twice the period (Ti−1).

4. The flash memory data storage apparatus as set forth in claim 3, wherein the flash interface further comprises a control clock generator that supplies the first through n'th transfer control clock signals.

5. The flash memory data storage apparatus as set forth in claim 1, wherein the i'th flash input buffer comprises i'th data latches, in number of the Ni, providing data each for the i'th input-buffer bus groups in response to sequential clock pulses in the i'th transfer control clock signal every Ni pulses.

6. The flash memory data storage apparatus as set forth in claim 5, wherein the i'th flash input buffer further comprises an i'th latch selection counter that counts clock pulses in the i'th transfer control clock signal, except in the case where i is n, and that supplies i'th latch counting signals, in number of the Ni, which control data transfer operations of the i'th data latches.

7. A flash memory data storage apparatus that transceives data with an external system through a host bus group in parallel, comprising:
 a flash memory that transceives data through a flash bus group, a bus width (FW) of the flash bus group being greater than a bus width (HW) of the host bus group, where the bus width (FW) of the flash bus group and the bus width (HW) of the host bus group each represents a number of bus lines that transceive data in parallel in response to a same clock signal;
 a buffer memory that temporarily stores transferred data; a host interface that controls data transmission between the host bus group and the buffer memory; and
 a flash interface that controls data transmission between the flash bus group and the buffer memory, wherein the flash interface includes first through n'th flash input buffers that transfer data to the flash memory in stages in response to first through n'th transfer control clock signals, where n≧2, wherein, in a stage of the stages, an i'th flash input buffer of the first through n'th flash input buffers, where 2≦i≦n, receives data from an (i−1)'th flash input buffer, and provides data through i'th input-buffer bus groups to the flash memory in number of at least Ni, wherein a bus width (IBWi) of each of the i'th input-buffer bus groups is wider than a bus width (IBWi−1) of each of (i−1)'th input-buffer bus groups, wherein the first through n'th transfer control clock signals comprise an (i−1)'th transfer control clock signal and an i'th transfer control clock signal that is the (i−1)'th transfer control clock signal having a lengthened period, wherein a period (Ti) of the i'th transfer control clock signal applied to the i'th flash input buffer is longer than a period (Ti−1) of the (i−1)'th transfer control clock signal applied to the (i−1)'th flash input buffer, and wherein the Ni is obtained by dividing the bus width (FW) of the flash bus group by the bus width (IBWi) of the each of the i'th input-buffer bus groups.

8. The flash memory data storage apparatus as set forth in 7, wherein the buffer memory comprises:
 first and second temporary storage units that each transceive data, which is composed of a bus width of the host bus group, with the host interface and the flash interface; and
 a buffering multiplexer that provides data of the host bus group from the host interface for an alternative one of the first and second temporary storage units, and that provides data from the first and second temporary storage units for an alternative one of the host interface and the flash interface.

9. The flash memory data storage apparatus as set forth in claim 8, wherein each of the first and second temporary storage units includes an SRAM storing data with a bus width (FW) of the flash bus group.

10. The flash memory data storage apparatus as set forth in claim 9, wherein the host interface comprises a chip selection multiplexer that provides first and second storage enable signals for the buffering multiplexer by de-multiplexing a chip enable signal provided from the external system in response to a selection address, the first storage enable signal controlling data to be provided from the external system for the first temporary storage unit, the second storage enable signal controlling data to be provided from the external system for the second temporary storage unit.

11. A flash memory data storage apparatus that transceives data with an external system through a host bus group in parallel, comprising:
 a flash memory that transceives data through a flash bus group, a bus width (FW) of the flash bus group being greater than a bus width (HW) of the host bus group, where the bus width (FW) of the flash bus group and the bus width (HW) of the host bus group each represents a number of bus lines that transceive data in parallel in response to a same clock signal; and
 a flash interface that controls a data transmission operation between the flash bus group and the host bus group, wherein the flash interface includes first through n'th flash input buffers that transfer data to the flash memory in stages in response to first through n'th transfer control clock signals, where n≧2, and wherein an i'th flash input buffer, where 2≦i≦n, provides data through i'th input-buffer bus groups in number of at least Ni, wherein a bus width (IBWi) of each of the i'th input-buffer bus groups is wider than a bus width (IBWi−1) of each of (i−1)'th input-buffer bus groups, wherein a period (Ti) of an i'th transfer control clock signal is longer than a period (Ti−1) of an (i−1)'th transfer control clock signal, wherein the Ni is obtained by dividing the bus width (FW) of the flash bus group by the bus width (IBWi) of the each of the i'th input-buffer bus groups, wherein the bus width (IBWi) is twice the bus width (IBWi−1), wherein the period (Ti) is twice the period (Ti−1), wherein the flash interface further comprises a control clock generator that supplies the first through n'th transfer control clock signals, and wherein the control clock generator comprises:
 a reference clock generator that supplies a j'th transfer control clock signal; and
 a period modulator that varies a period of the j'th transfer control clock signal and that provides the first through n'th transfer control clock signals, wherein j is (n1)/2 when n is an odd number, and wherein j is n/2 when n is an even number.

12. A flash memory data storage apparatus that transceives data with an external system through a host bus group in parallel, comprising:
 a flash memory that transceives data through a flash bus group, a bus width (FW) of the flash bus group being greater than a bus width (HW) of the host bus group, where the bus width (FW) of the flash bus group and the bus width (HW) of the host bus group each represents a number of bus lines that transceive data in parallel in response to a same clock signal; and
 a flash interface that controls a data transmission operation between the flash bus group and the host bus group, wherein the flash interface includes first through n'th flash input buffers that transfer data to the flash memory in stages in response to first through n'th transfer control clock signals, where n≧2, and wherein an i'th flash input buffer, where 2≦i≦n, provides data through i'th input-buffer bus groups in number of at least Ni, wherein a bus width (IBWi) of each of the i'th input-buffer bus groups is wider than a bus width (IBWi−1) of each of an (i−1)'th input-buffer bus groups, wherein a period (Ti) of an i'th transfer control clock signal is longer than a period (Ti−1) of an (i−1)'th transfer control clock signal, wherein the Ni is obtained by dividing the bus width (FW) of the flash bus group by the bus width (IBWi) of the each of the i'th input-buffer bus groups, wherein the flash interface further comprises:
- an output buffer that transfers data from the flash memory to output-buffer bus groups, which is in number of the Ni, in response to the n'th transfer control clock signal; and
- a flash output multiplexer that selects one of the output-buffer bus groups in sequence and provides data from the selected output-buffer bus group for the external system, in response to clock pulses in the first transfer control clock signal every Ni pulses.

13. The flash memory data storage apparatus as set forth in claim 12, wherein the flash output multiplexer comprises:
- an output multiplexer that selects one of the Ni output-buffer bus groups in sequence; and
- multiplexing counters that count clock pulses in the first transfer control clock signal and provide multiplexer-counting signals, in number of Ni, which select the output-buffer bus group.

14. A flash memory data storage apparatus that transceives data with an external system through a host bus group in parallel, comprising:
- a flash memory that transceives data through a flash bus group, a bus width (FW) of the flash bus group being greater than a bus width (HW) of the host bus group, where the bus width (FW) of the flash bus group and the bus width (HW) of the host bus group each represents a number of bus lines that transceive data in parallel in response to a same clock signal;
- a buffer memory that temporarily stores transferred data;
- a host interface that controls data transmission between the host bus group and the buffer memory; and
- a flash interface that controls data transmission between the flash bus group and the buffer memory, wherein the flash interface includes first through n'th flash input buffers that transfer data to the flash memory in stages in response to first through n'th transfer control clock signals, where n≧2, and wherein an i'th flash input buffer, where 2≦i≦n, provides data through i'th input-buffer bus groups in number of at least Ni, wherein a bus width (IBWi) of each of the i'th input-buffer bus groups is wider than a bus width (IBWi−1) of each of (i−1)'th input-buffer bus groups, wherein a period (Ti) of an i'th transfer control clock signal is longer than a period (Ti−1) of an (i−1)'th transfer control clock signal, wherein the Ni is obtained by dividing the bus width (FW) of the flash bus group by the bus width (IBWi) of the each of the i'th input-buffer bus groups, wherein the buffer memory comprises:
- first and second temporary storage units that each transceive data, which is composed of a bus width of the host bus group, with the host interface and the flash interface; and
- a buffering multiplexer that provides data of the host bus group from the host interface for an alternative one of the first and second temporary storage units, and that provides data from the first and second temporary storage units for an alternative one of the host interface and the flash interface, wherein each of the first and second temporary storage units includes an SRAM storing data with the bus width (FW) of the flash bus group, wherein the host interface comprises a chip selection multiplexer that provides first and second storage enable signals for the buffering multiplexer by de-multiplexing a chip enable signal provided from the external system in response to a selection address, the first storage enable signal controlling data to be provided from the external system for the first temporary storage unit, the second storage enable signal controlling data to be provided from the external system for the second temporary storage unit, and wherein the host interface further comprises a host output multiplexer that selects one of data groups provided from the first and second temporary storage units, and provides the selected data group for the external system.

* * * * *

UNITED STATES PATENT AND TRADEMARK OFFICE
CERTIFICATE OF CORRECTION

PATENT NO.        : 7,467,251 B2
APPLICATION NO.   : 11/224662
DATED             : December 16, 2008
INVENTOR(S)       : Min-Gun Park et al.

It is certified that error appears in the above-identified patent and that said Letters Patent is hereby corrected as shown below:

Column 14, line 44 delete "(n1)/2" and insert --(n+1)/2--

Signed and Sealed this

Twenty-first Day of April, 2009

JOHN DOLL
*Acting Director of the United States Patent and Trademark Office*